(12) United States Patent
Maizeroi-Eugene (10) Patent No.: US 9,105,095 B2
(45) Date of Patent: Aug. 11, 2015

(54) METHOD AND DEVICE FOR IMAGE PROCESSING, NOTABLY TO PROCESS MEDICAL IMAGES

(76) Inventor: Franck Maizeroi-Eugene, Fontenay aux Roses (FR)

( * ) Notice: Subject to any disclaimer, the term of this patent is extended or adjusted under 35 U.S.C. 154(b) by 1152 days.

(21) Appl. No.: 12/600,373

(22) PCT Filed: Jun. 12, 2009

(86) PCT No.: PCT/EP2009/057313
§ 371 (c)(1),
(2), (4) Date: Sep. 8, 2011

(87) PCT Pub. No.: WO2009/150236
PCT Pub. Date: Dec. 17, 2009

(65) Prior Publication Data
US 2011/0311120 A1    Dec. 22, 2011

(30) Foreign Application Priority Data

Jun. 12, 2008   (FR) ..................................... 08 53911

(51) Int. Cl.
*G06K 9/68*     (2006.01)
*G06T 7/00*     (2006.01)
*G06T 17/10*    (2006.01)

(52) U.S. Cl.
CPC ............ *G06T 7/0081* (2013.01); *G06T 7/0024* (2013.01); *G06T 17/10* (2013.01); *G06T 2200/08* (2013.01); *G06T 2207/30004* (2013.01)

(58) Field of Classification Search
None
See application file for complete search history.

(56) References Cited

U.S. PATENT DOCUMENTS 4,791,567 A * 12/1988 Cline et al. .................... 345/424
4,991,224 A    2/1991 Takahashi et al.
5,056,146 A * 10/1991 Nishide ......................... 382/131

OTHER PUBLICATIONS

Brummer et al., "Automatic Detection of Brain Contours in MRI Data Sets", *IEEE Transactions on Medical Imaging*, vol. 12, No. 2 (1993) pp. 153-166.
Kennedy et al., "Anatomic Segmentation and Volumetric Calculations in Nuclear Magnetic Resonance Imagining", *IEEE Transactions on Medical Imaging*, vol. 8, No. 1 (1989) pp. 1-7.

(Continued)

*Primary Examiner* — Kim Vu
*Assistant Examiner* — Fred Hu
(74) *Attorney, Agent, or Firm* — Birch, Stewart, Kolasch & Birch, LLP (57) ABSTRACT

A method to transmit a label between two images, characterized in that the method includes the following steps:
  providing a first image, the first image comprising several sets of connected points, each set being characterized by a label,
  providing a second image,
  from the second image, determining several sets of connected points,
  superimposing the two images to determine the common parts and non-common parts of the sets in the first and second image,
  giving each common part of the second image, the label of the set in the first image with which said part is common,
  giving each non-common part of the second image in contact with a single set of connected points in the first image, the label of said set,
  giving a new label to each non-common part of the second image not in contact with any set in the first image.

11 Claims, 10 Drawing Sheets

Image of the superimposition of the two images

(56) References Cited

OTHER PUBLICATIONS

Gering et al., "An Integrated Visualization System for Surgical Planning and Guidance Using Image Fusion and an Open MR", *Journal of Magnetic Resonance Imaging*, vol. 13 (2001) pp. 967-975.

Te Brake et al., "Detection Criteria for Evaluation of Computer Aided Diagnosis Systems", *18th Annual International Conference of the IEEE Engineering in Medicine and Biology Society*, (1996) pp. 1157-1158.

Treece et al., "Surface Interpolation from Sparse Cross Sections Using Region Correspondence", *IEEE Transactions on Medical Imaging*, vol. 19, No. 11 (2000) pp. 1106-1114.

Meyers et al., "Surfaces from Contours", *ACM Transaction on Graphics*, vol. 11, No. 3 (1992) pp. 228-258.

Zyda et al., "Surface Construction from Planar Contours", *Computers & Graphics*, vol. 11, No. 4 (1987) pp. 393-408.

Bajaj et al., "Arbitrary Topology Shape Reconstruction from Planar Cross Sections", *Graphical Models and Image Processing*, vol. 58, No. 6, (1996) pp. 524-543.

Park, "A Hybrid Approach to Smooth Surface Reconstruction from 2-D Cross Sections", *International Journal of Advanced Manufacturing Technology*, vol. 25 (2005) pp. 1130-1136.

\* cited by examiner

FIG. 3a

Preceding image $1^{n-1}$

FIG. 3b

Current image $1^n$

FIG. 3c

Image $C^n$
Superimposition of $1^n$ and $1^{n-1}$

FIG. 3d

Current image $1^n$ with global labels

FIG. 4a

Image $I^{n-1}$

FIG. 4b

Image $I^n$

FIG. 4c

Image $C^n$
Superimposition of $1^n$ and $1^{n-1}$

FIG. 4d

Image $1^n$ with global labels

FIG. 5a

Preceding image

FIG. 5b

Current image

FIG. 5c

Image of the superimposition of the two images

METHOD AND DEVICE FOR IMAGE PROCESSING, NOTABLY TO PROCESS MEDICAL IMAGES

CROSS-REFERENCE TO RELATED APPLICATIONS

This application is a National Phase Entry of International Application No. PCT/EP2009/057313, filed on Jun. 12, 2009, which claims priority to French Application 0853911, filed on Jun. 12, 2008, both of which are incorporated by reference herein.

BACKGROUND AND SUMMARY

The invention concerns the area of processing a sequence of images, and more particularly the processing of a sequence of medical images such as MRI images.

Purely visual, qualitative analysis of medical images is difficult and requires much experience on the part of the practitioner. Current possibilities of processing digital data provided by medical equipment, such as imaging equipment, makes it possible to use a method to assist the practitioner, notably to evaluate the volume of components which the practitioner wishes to examine, these generally being anomalies (lesions, tumour, stroke event, etc.). Algorithms of greater or lesser performance to adjust images, segment and automatically quantify anomalies have been developed. The objective, in particular, is to quantify the progress of a disease reliably, objectively and in reproducible manner, and to reduce the time spent by the practitioner in analyzing images.

The analysis of medical images has become an important point in medical diagnosis and in the decisional aspect of any surgical procedure. Image analysis has been substantially improved, in particular through the possibility to make digital interpretation of medical images (such as MRI images). A digital image is in fact a set of data having a certain position and a certain value (e.g. grey scale). Digital processing of images amounts simply to handling these data with a view to obtaining desired information.

In general, image-assisted medical diagnosis makes it possible to generate a series of successive images representing a set of successive slices of a body organ or body part of a patient. Since analysis is essentially based on digital image data, the whole problem is that of knowing how to interpret reality from these data, bearing in mind that such data is only a more or less true representation of reality. In addition, the difficulty in analyzing a series of images lies in the ability to relate between the elements identified in a given image and those identified in all the other images of the series.

At the present time, the calculation of volumes in medical images of MRI type for example is not calculated directly in 3D. It is carried out with the aid of two-dimensional computer tools (measurement of length with a computer screen ruler, measurement of an ellipse, a polygon, a disc) in each image section (axial, sagittal, and coronal), after which the practitioner manually carries out an approximate calculation. Since the volume of anomalies (stroke event or tumour for example) is rarely of simple geometric shape, this extrapolation method generates lack of precision in the 3 dimensions and therefore leads to an amplified delta error.

In particular by denoting: n
A the surface to be measured in the axial section and $\Delta a$ its measurement uncertainty in this sectional plane;
S the surface to be measured in the sagittal section and $\Delta s$ its measurement uncertainty in this sectional plane;
F the surface to be measured in the coronal section and $\Delta f$ its measurement uncertainty in this sectional plane,
the calculation of volume V in medical images is made using the following formula:

$$V=A*S*F \text{ with an uncertainty of } \Delta v=V*(\Delta a/A+\Delta s/S+\Delta f/F)$$

One objective of the invention is to propose an improved method and device to process a sequence of images compared with the state of the art, with which it is possible in particular to improve the accuracy and reliability of volume calculation using said images. For this purpose, the invention proposes a method to transmit a label between two images, the method comprising the following successive steps:
providing a first image, the first image comprising several sets of connected points, each set being characterized by a label,
providing a second image,
determining from the second image several sets of connected points,
superimposing the two images to determine common parts and non-common parts between the sets of the first and second image,
to each common part of the second image, giving the label of the set in the first image with which said part is common,
to each non-common part of the second image in contact with a single set of connected points in the first image, giving the label of said set,
to each non-common part of the second image not in contact with any set in the first image, giving a new label.

Advantageously, but optionally, the invention comprises at least one of the following characteristics:
the method comprises an additional step in which each non-common part of the second image in contact with at least two sets of the first image having a different label, is deleted,
the method comprises an additional step in which a new label is given to each non-common part of the second image in contact with at least two sets of connected points in the first image having a different label,
the method comprises an additional step in which each non-common part of the second image in contact with at least two sets of the first image having a different label, is given the label of one of the two sets,
each label is characterized by a value, the method further comprising the following step:
creating an equivalence between the labels of two sets of the first image in contact with a same set in the second image.
several labels are incompatible so that no equivalence is created between these labels,
the step to determine the sets comprises at least one of the following processing steps: segmentation, application of a variance filter, region filling step.

The invention also concerns a method to determine volumes using different images, each image representing successive, substantially parallel planes, the method comprising the following steps:
choosing an initial image among the group of images,
selecting points in the initial image whose volume it is desired to determine,
determining several sets of connected points in the initial image so that the selected points belong to the same set, said set having a primary label, the other sets having a secondary label, implementing the label transmission method according to the invention, on all the images, determining the volume corresponding to the sets of each image comprising said specific label.

Advantageously, but optionally, this method comprises at least one of the following characteristics:

the volume determination step comprises a step to integrate the surface areas of the sets of each image comprising said specific label.

The invention also concerns a method to determine volume from medical CT-scan or MRI images, comprising all the steps of the method to determine volumes according to the invention. The invention also concerns a method to determine volume from a CT-scan or MRI image of a patient's brain, the method comprising all the steps of the method to determine volumes according to the invention, characterized in that it previously comprises the following steps:

in the initial image, determining the set corresponding to the patient's cranium, in the initial image, determining the set corresponding to the patient's brain.

The invention also concerns a device to determine volume from medical images, for example CT-scan or MRI images, characterized in that it comprises means to implement all the steps of the method according to the invention. The invention also concerns a device according to the preceding claim, which further comprises an apparatus to acquire said medical images, such as MRI or scanning equipment. The invention also concerns a computer programme product comprising programme code instructions recorded on a medium which can be used in a computer, to implement all the steps of the method according to the invention.

Said method can advantageously be used for semi-automatic measurement (for example with a click by the practitioner on a region of interest and optionally colour enhanced by corresponding software), instant measurement, and to specify volumes from medical images. Said method can advantageously be dedicated to images of a brain MRI, applied in particular to measure tumours and stroke events. The method may also be dedicated to tumours of the pelvis. With said method it is possible, unexpectedly, to obtain fast, accurate measurements of the volume of an anomaly (stroke event, lesion, etc.) and can be used for more accurate decision on the treatment to be given; in particular to take a safe decision for a complex and/or hazardous operation. Said decision generally depends on a threshold volume. For example, in the case of a stroke, surgical procedure is decided if the volume of the anomaly exceeds one third of the brain MCA territory. Therefore, with a volume calculation method according to the invention, this trigger threshold for surgical procedure (such as thrombolysis) is reliable and reproducible.

BRIEF DESCRIPTION OF DRAWINGS

Other characteristics, purposes, and advantages of the present invention will become apparent on reading the detailed description below with reference to the appended drawings given as non-limiting examples, in which.

DETAILED DESCRIPTION

The method of the invention is previously based on processing applied to the medical images. Amongst these processing operations, particular use is made of segmentation and thresholding.

Segmentation

Segmentation consists is dividing or partitioning an image into homogeneous regions in accordance with a chosen criterion (grey scale, texture, etc.), to extract useful information, for example by individualizing sets of shape and/or signal within normal structures.

Thresholding

Thresholding is a type of segmentation which enables an image to be binarised by choosing two values (a minimum and a maximum) as selection criterion, depending on whether each pixel of the image does or does not belong to the interval between these two values.

Connectivity

Segmentation is used to partition an image into several sets. A set of points is characterized by the connectivity existing between all the points of this set. A distinction is made between two levels of connectivity:

4-connectivity, 8-connectivity.

Figure 1A:
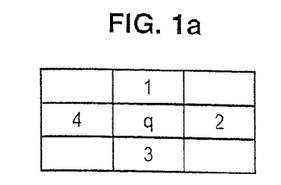
FIGS. 1a and 1b are examples of connectivities between pixels.
Figure 1B:
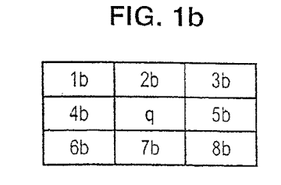
Figure 2:
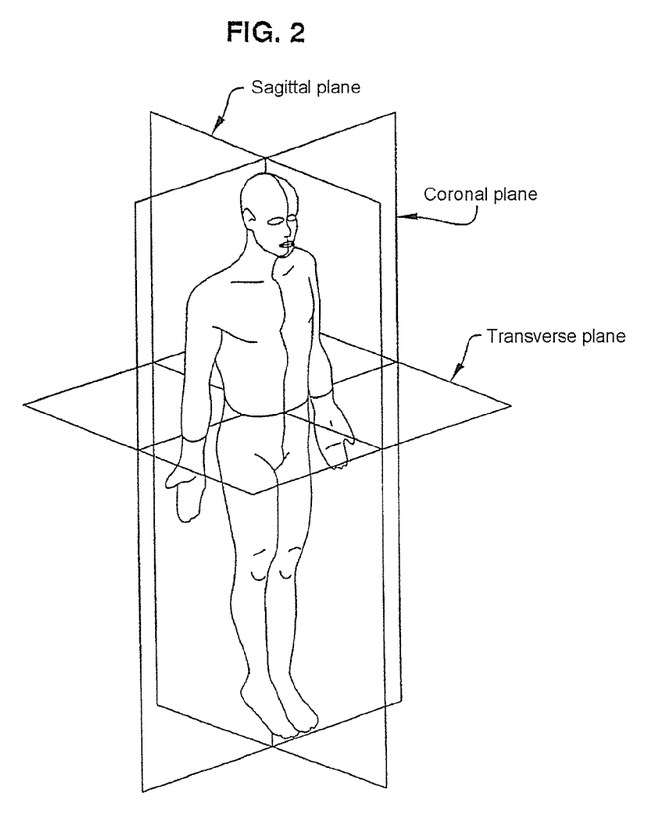
FIG. 2 is a simplified diagram of the human body showing the three sections: sagittal, coronal and transverse.

With reference to FIG. 1a, 4-connectivity is established from the horizontal and vertical neighbouring pixels of each pixel. Let p and q be two pixels. If pixel p is one of the 4 neighbours (1 to 4) of pixel q, p and q have 4-connectivity. With reference to FIG. 1b, 8-connectivity is established from the neighbouring horizontal, vertical, and diagonal pixels of each pixel. Let p and q be two pixels. If pixel p is one of the 8 neighbours (1b to 8b) of pixel q, then p and q have 8-connectivity.

Post-Treatment

The result of segmentation may not be satisfactory, however, for the practitioner. For example, the contour of some anomalies may be over- or under-estimated. Segmentation is effectively so-called "low-level" processing and the images are often segmented on the sole properties of the pixels. Practitioners use not only the properties of the pixels but also anatomic knowledge, previous experience, etc. Such prior knowledge allows the results of segmentation to be improved. In particular, by reducing false positives and false negatives (i.e. sets which have been wrongly segmented). This prior knowledge is contributed during the post-treatment step of images segmented using artificial intelligence techniques, for example neural networks and fuzzy logic systems.

Labelling Operation

After the segmentation operation, a labelling operation is carried out. The labelling operation consists of assigning, within a binary image, one same value (called a label) to each pixel belonging to a set of connected pixels. Each set of connected points is therefore characterized by a label. It is to be noted that several connected sets may have the same label.

The sets are such that none of the sets can have connectivity with another set, since otherwise these two sets would belong to one same connected set and would therefore have the same label. A label is associated with a value which is generally chosen from set N*, i.e. in the interval $[1, \infty]$. Label values are preferably assigned in increasing order.

Region Filling

Let us consider a set of connected points, having closed cavities (similar to holes) subsequent to image processing (windowing, thresholding as explained above). Since this treatment has caused the loss of connected sets, and given rise to these holes, it is possible to relocate these connected sets and to attach them to the initial set so as to form only one connected set (without any holes). A closing or dilating operation can be used prior to the filling operation to close the open cavities of the initial connected set. These closing or dilating operations are well known in the art and will not be further detailed.

Variance Filter

The operator is a mask of size 3×3 (or more). When it is applied to a point of the image (said point being in the centre of the mask) it assigns, to said point, the variance of all the sets of points covered by the mask. This mask is applied to all the points of the image except the edge of the image since there are points missing on the outside of the image. The larger the mask, the larger the edge of the image (exclusion edge). For a mask of size 3×3 the edge is of dimension 1. It is recalled that variance is characteristic of the dispersion of the sample with a formula of type:

Variance=(mean of the sum of squared values)−(mean square value).

Said variance filter can be applied after thresholding to improve the result of thresholding. This operator advantageously replaces the band-pass filter (frequency filter) in several applications.

3D Labelling

The objective of 3D labelling is to create a correspondence system on a set of connected voxels in the 3 planes in space (axial, coronal, sagittal). The voxel (contraction of "volumetric pixel") is a 3D pixel. A voxel is used to represent 3D spaces, in physics or in 3D medical imaging, in particular for the digital processing of 2D slices produced by the medical investigation machines cited above (CT-scan, MRI, etc.). Therefore, on a series of images consisting of pixels, said correspondence system between pixels of different images can be used to establish sets of voxels.

This 3D labelling operation applies to a series of successive images in one of the 3 planes representing different sets of voxels in space. In general, analysis is performed on a series of successive, substantially parallel medical images in one of the planes (axial, coronal, sagittal). To each connected set obtained in an image, a label is assigned using the following approach: if two successive images are superimposed, the connected sets having common parts will carry the same global label. In fact, throughout all the images, the voxels forming a set of connected points in the three planes will carry the same label.

With reference to FIGS. 1a to 5d, by "parts" is meant the sub-sets of sets in the second image resulting from the partitioning of said sets by superimposing the contours of the sets in the first image over the sets in the second image. More precisely, the "common parts" are sub-sets of the sets in the second image of which each pixel is common to the sets of the first image and of the second image. By extension, by "non-common part" is meant sub-sets of the sets in the second image resulting from amputation of the parts common to said sets.

With reference to FIGS. 3a to 3d, an image called $I^{n-1}$ is provided. The image comprises several connected sets, each set being characterized by a global label. The label is global in that it is common to one or more previous processed images. Then, a following image (called $I^n$) is provided, illustrated FIG. 3b. After a processing operation of the image, several sets are determined. Each of the sets has a so-called local label i.e. these labels are only valid for the current image.

Figure 3A:
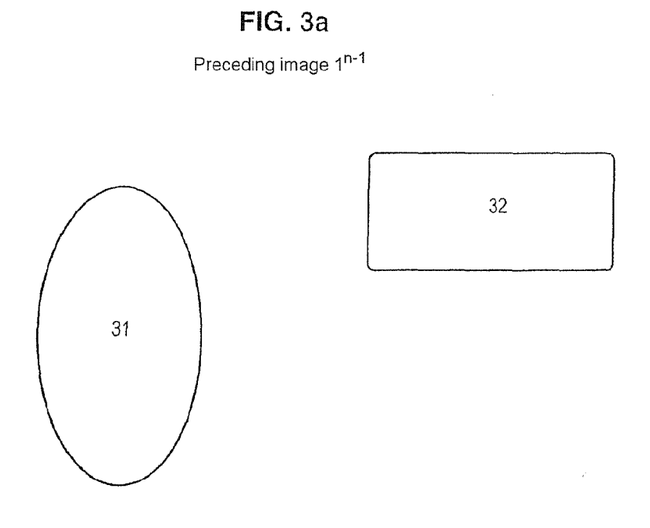
FIGS. 3a to 3d show an exemplary application of a labelling method according to one possible embodiment of the invention.
Figure 3B:
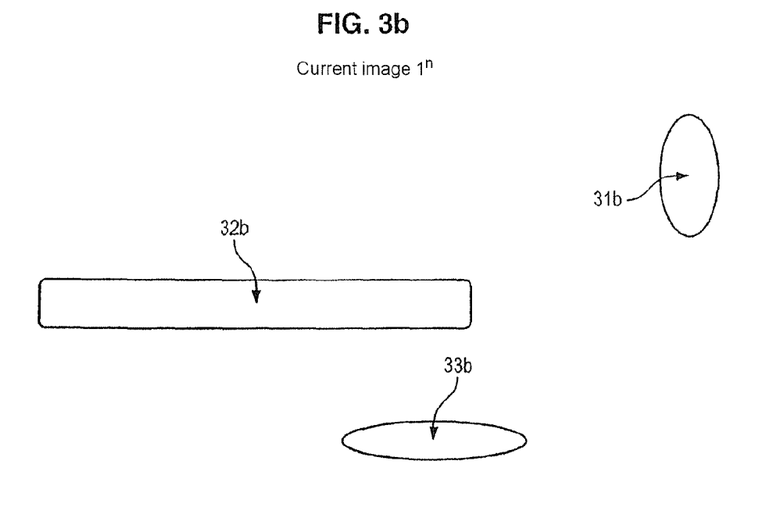
Figure 3C:
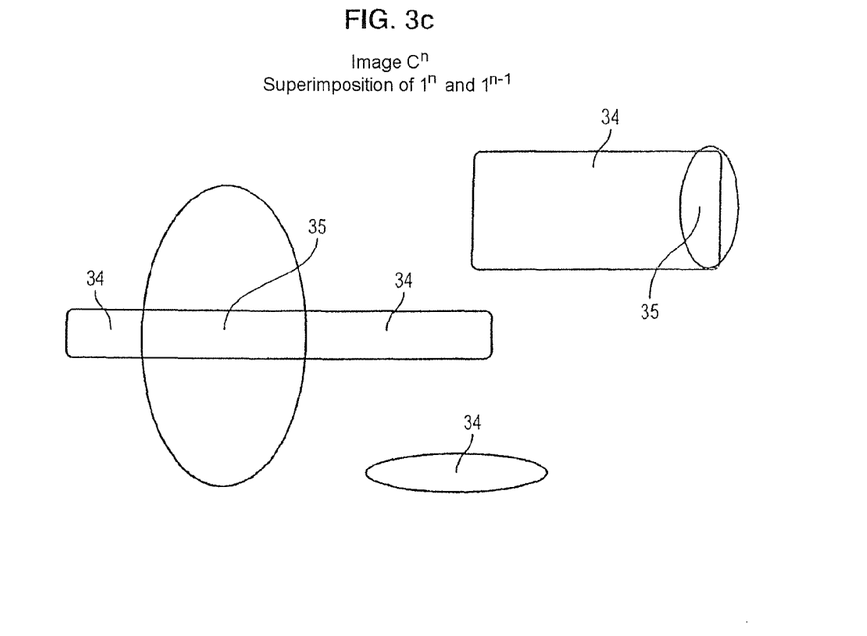
Figure 3D:
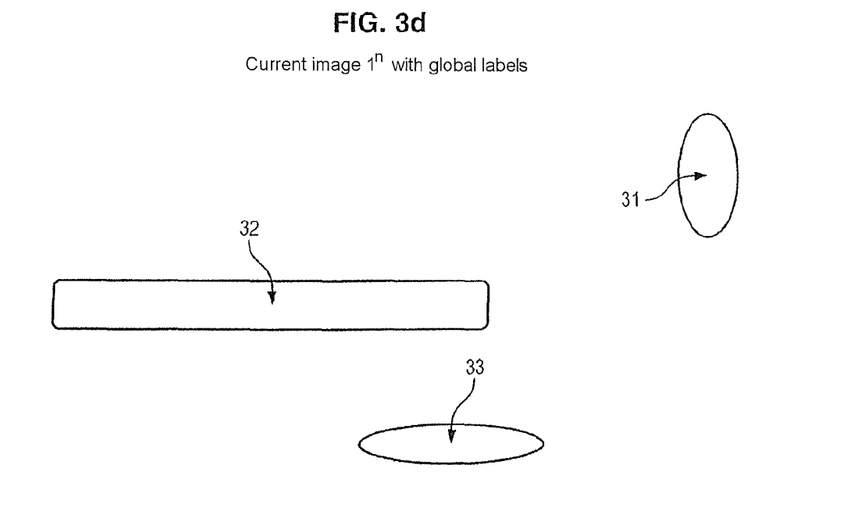

The two images ($I^n$ $^{et}$ $I^{n-1}$) are then superimposed to determine the common parts and non-common parts of the sets in the first and second image. This superimposition allows an image $C^n$ to be obtained, shown FIG. 3c. This image superimposition enhances the common parts 35 which are common to the sets in image $I^{n-1}$ and in image $I^n$. Complementarily, this superimposition enhances the non-common parts 34 which are the complement of the sets in Figure $I^n$ relative to the common parts 35. Each common part in image $I^n$ is then given the global label of the sets in the first image with which said parts are common, thereby making it possible to establish the link (correspondence) between the different images. In parallel, each non-common part of the second image in contact with a single set of image $I^{n-1}$ is given the global label of said set. Finally each non-common part of the second image not being in contact with any set of the first image is given a new label not belonging to any of the sets of the first image in the illustrated example, the local label 33b becomes the global label 33.

Figure 4A:
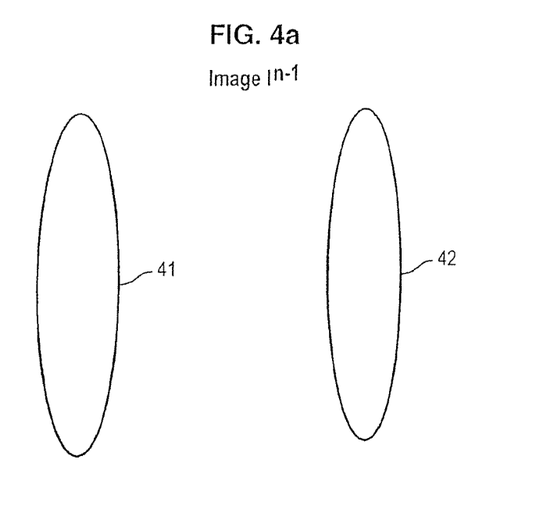
FIGS. 4a to 4d show an exemplary application of a labelling method according to one possible embodiment of the invention.

With reference to FIGS. 4a to 4d, and according to one possible embodiment of 3D labelling, the method comprises the following steps:

A current image, called $I^{n-1}$, is provided (see FIG. 4a). This image comprises several sets each associated with a global label 41 and 42.

Figure 4B:
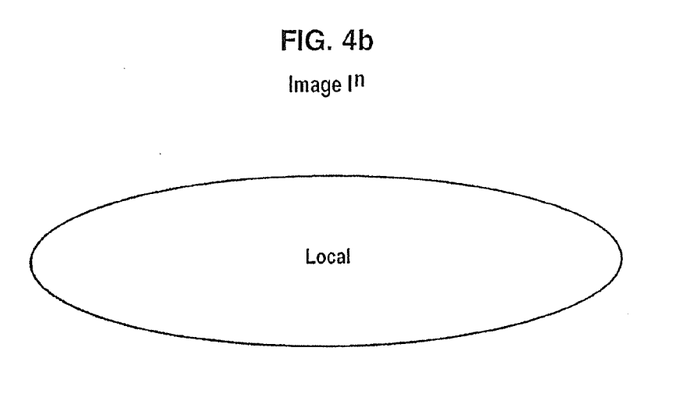

Then, a following image (called $I^n$) is provided, shown FIG. 4b. After processing said image such as described previously, several sets are determined, from image segmentation in particular, each set being characterized by a local label.

The two images ($I^n$ and $I^{n-1}$) are then superimposed to determine the common parts and the non-common parts of the sets in the first and second image. This superimposition allows an image $C^n$ to be obtained, shown FIG. 4c. This image superimposition enhances the common parts 43a and 43b which are common to the sets in image $I^{n+1}$ and image $I^n$. Complementarily, this superimposition also enhances the non-common parts 44a, 44b and 45 which are the complement of the sets in Figure $I^n$ with respect to the common parts.

Figure 4C:
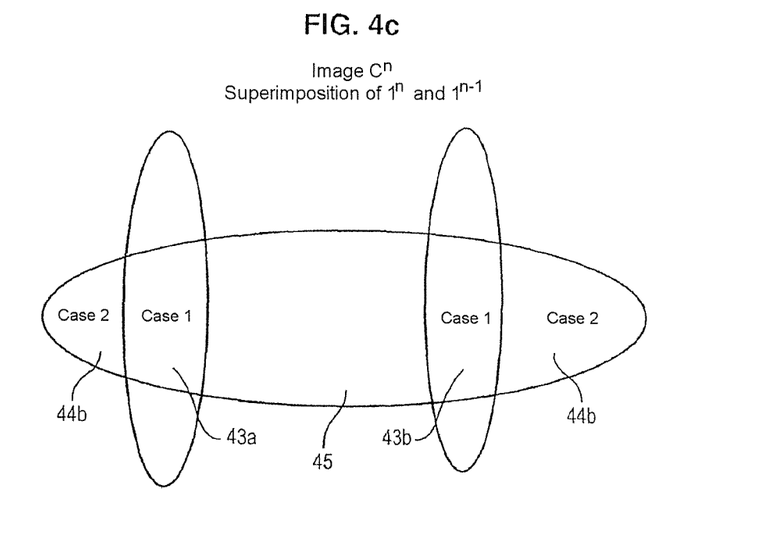

Each common part of image $I^n$ is then given the global label of the sets in the first image with which said parts are common, In parallel, each non-common part of the second image in contact with a single set of image $I^{n+1}$ is given the global label of said set (parts 44a and 44b).

Finally, the non-common part 45 of the second image, in contact with two sets of the first image having a different global label, is deleted.

Figure 4D:
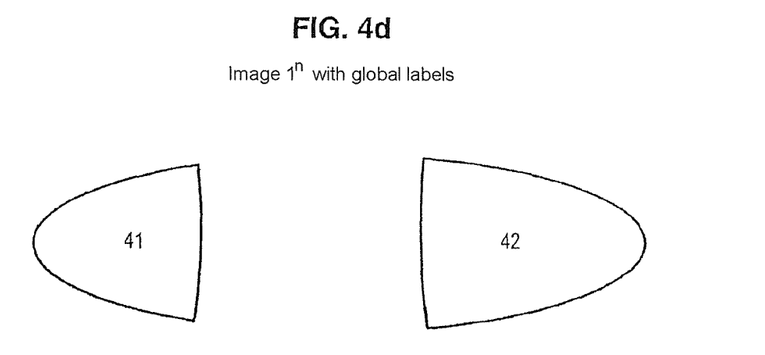

With reference to FIG. 4d, a link is established between the global labels 41 and 42 and the parts of sets so labelled.

Figure 5A:
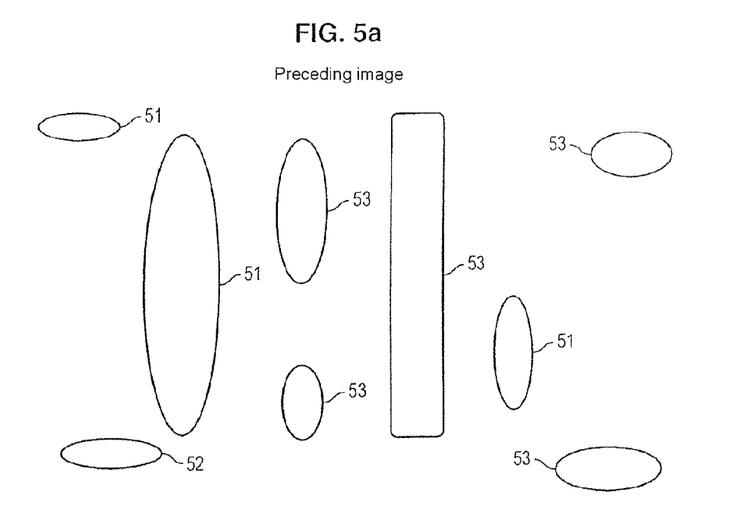
FIGS. 5a to 5d show an example of application of a labelling method according to one possible embodiment of the invention.

With reference to FIGS. 5a to 5e, a more complex case is illustrated. The method then comprises the following steps:

A current image, called $I^{n-1}$ is provided (see FIG. 5a). This image comprises several sets 41 and 42 each associated with a global label 51, 52, or 53.

Figure 5B:
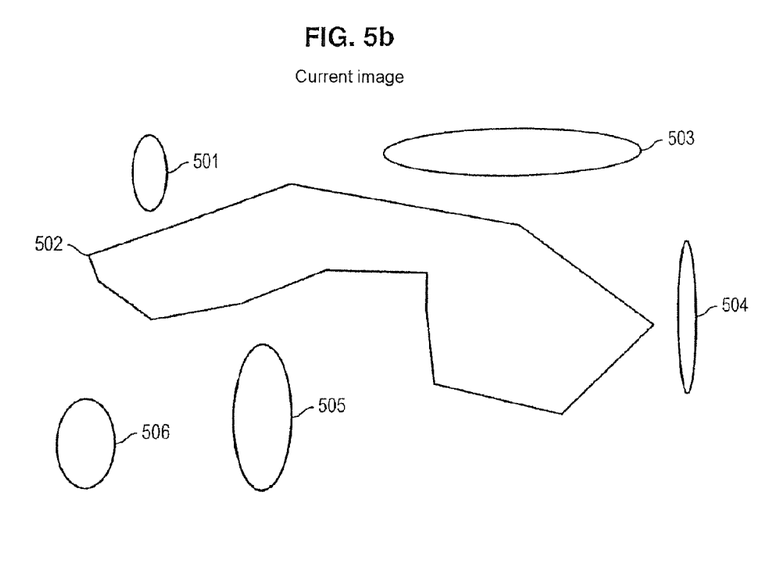

Then, a following image (called I″) is provided, shown FIG. 5b. After processing said image, such as described previously, several sets are determined from image segmentation in particular, each set being characterized by a local label 501, 502, 503, 504, 505, or 506.

The two images (I″ and I″⁻¹) are then superimposed to determine the common parts and the non-common parts of the sets in the first and second images. This superimposition allows an image C″ to be obtained, shown FIG. 5c. This image superimposition enhances the common parts 502b, 502c, 502d, 502f, 503b, 503e, and 506b which are common to the sets of image I″⁺¹ and of image I″. Complementarily, this superimposition enhances the non-common parts which are the complement of the sets in image I″ with respect to the common parts.

Figure 5C:
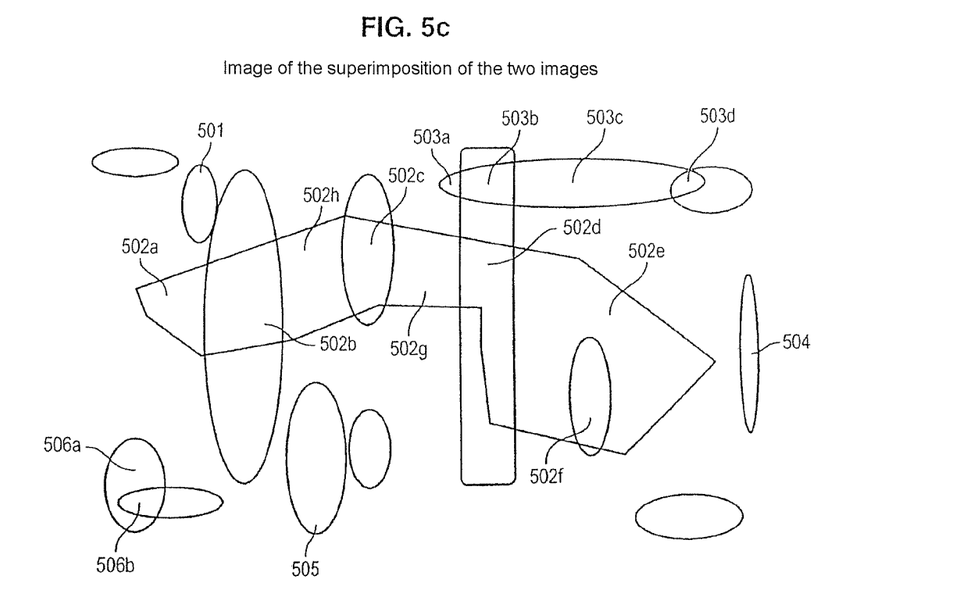

Each common part of image I″ is then given the global label of sets in the first image with which said parts are common. In parallel, each non-common part of image I″ in contact with a single set of image I″⁻¹ is given the global label of said set (parts 502a, 501, 503a, 503c, 506a). Non-common parts 502h and 502e of the second image, in contact with two sets of the first image having a different global label, are deleted.

Figure 5D:
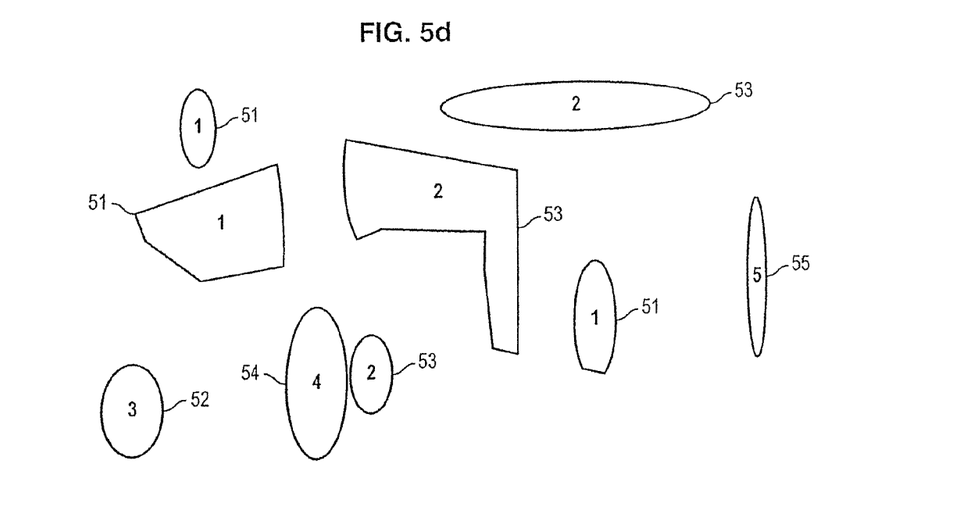

With reference to FIG. 5d, a link is established between global labels 51 and 52 and the parts of sets so labelled. Finally, parts 505 and 504 which are not in contact with any set of image I″⁻¹ are labelled with a new global label 54 and 55.

To conclude, a non-common part in contact with at least two sets not having the same global label value can:
  either be deleted, which gives a distinct separation between two global labels.
  or be assigned a new global label value, which gives a distinct separation between two global labels whilst maintaining the information of said part.
  or be assigned the global label of one of these sets, which ensures that no information concerning a global label is lost.

This decision is taken following a decisional rule that is initially set. This rule is used to define how to process non-common parts connected to at least two sets not having the same global label value. This rule can therefore define that said part is deleted, as illustrated FIGS. 4a to 4d and 5a to 5d.

This rule may also define that said part is assigned a new global label value which has not yet been used in the method, generally by incrementing the value of the last assigned global label. This rule may also define that said part is assigned the global label value of one of the two sets in accordance with a label priority. However, to avoid sets or parts of sets being wrongly labelled, rules are defined according to which some global labels have compatibility and others do not have compatibility. The application of the decisional rule concerning non-common parts will differ according to the compatibility of the global labels in contact with said part.

During labelling procedure, each global label is memorized and the relationship is determined between the different pixels belonging to said global labels in a correspondence table, thereby making it possible to establish the link between the different images in the series of images. If, during the method and for a given image, a connected set is in contact with compatible global labels, these global labels will be said to have equivalence. Equivalence between these global labels consequently causes the equivalence of all the global labels equivalent thereto. Among a set of equivalent labels, the smallest label value is chosen which, in the equivalence table, is assigned to all equivalent labels. If, during the method and for a given image, a connected set is in contact with global labels of which some are incompatible with the others, the correspondence table of global labels is not modified; the incompatibility of some of these labels does not allow their equivalence.

According to a predefined rule, it is possible:
  To assign a new global label to this part, or
  To delete said part, making it possible to create a distinct separation between the two global labels.

It is to be noted that each pixel of an image is recorded with its position (3 coordinates x, y, image n°), its intensity and its label number.

On completion of the processing method on the series of initial images, a correspondence table is obtained from which the equivalence network of each global label can be reconstituted (and all labels equivalent to a given label) and thereby obtain broad reconstitution of the connected sets (in the three planes: axial, coronal, sagittal) i.e. finding the pixels recorded with a label contained in the equivalence network and thereby determine the voxels. Therefore, from a point belonging to a set of connected points in an image of the series, all broadly connected points can be found (i.e. in the three planes in space) to which this point belongs.

Region of Interest for the Practitioner

Prior to the labelling process, the practitioner selects an image in which an anomaly is seen (or region of interest) which it is desired to examine and in which it is best visible. With this image the practitioner is able to make a prior selection of points from which, after labelling this image, the labels of sets connected to these points are obtained. Preferably, the set comprising the selected points is given a global label value of 1. The other sets in the image are given the global label value 2.

The global label of value 1 is the label whose equivalence network will designate the desired connected sets sought by the practitioner. The global label of value 2 is the label whose equivalence network designates the connected sets which are unable to belong to the equivalence network with the global label value of 1. The global labels 1 and 2 are incompatible.

When processing the series of images, the correlation table is created as described previously. When two global labels are considered to be equivalent, the table is modified by placing the value of the label with the smallest value in their equivalence network for the two labels. However, equivalence is never possible between a global label of value 2 and a global label of value 1: these two labels are incompatible. This is a very important rule and avoids "contagion" of label 1 (set sought by the practitioner) to other sets in the image which in fact are not part of the desired set.

It is to be noted that, in a series of images, the first processed image is not necessarily the first image in the series. Therefore provision is made to choose an initial image, which then makes it possible to obtain two series of images:
  a first series part starting from this initial image, extending as far as the last image in upward direction,
  a second series part staring from this initial image, extending as far as the first image in the downward direction.

This choice of initial image allows selection of the best image in which the anomaly to be examined can be distinguished.

During processing of the first part of the series, the correspondence table is created, and it is the same table which is used for the second part of the series. To process the second part of the series, the initial image is used as previously but with the difference that the new global labels which are then assigned during the second part of the series start after the last label value reached during processing of the first series part. On completion of processing, the table of correspondence is obtained from which it is possible to reconstitute the equivalence network of each label, and thereby obtain broad reconstitution of the connected sets (i.e. in the three planes: axial, coronal, sagittal). Therefore, from global label 1 all broadly connected points related to this label can be found.

Application to a Series of MRI Brain Images

With reference to FIGS. 6a to 6d, we will describe application of the method of the invention to a series of MRI brain images. Initially, there is a series of successive images in the axial plane; these images derive from a magnetic resonance imaging process, MRI. The overall objective of the practitioner is to identify an anomaly in at least one of the images of the series (tumour, stroke event, etc.) so as to be able to perform chosen measurements on the anomaly (e.g. measurement of volume). From the initial series of images, the practitioner extracts a point cloud or more basically a series of images comprising the start and end of this anomaly.

Cranium Segmentation

For each image in the series and from the shape of the cranium, a connected set is calculated and the barycentre of the points of this set. To do so, simple thresholding is conducted i.e. binarising the image obtained with a maximum threshold and a minimum threshold, to achieve best segmentation of the cranium as illustrated FIG. 6a, in which the bone part in white can be clearly seen. Region filling is then performed to obtain the full shape of the cranium.

Segmentation of the Brain

For each image in the series and from the previously calculated region of the cranium, the shape of the brain is calculated. To do so, for each image the following are performed:
thresholding of the image to obtain the best segmentation of the brain as illustrated FIG. 6b,
provision is then made to reduce the shape of the cranium (previously segmented) by a given factor (generally a factor of proportion between 0.99 and 0.9) whilst maintaining its centring in the image, so as to define an exclusion region beyond the reduced shape. Therefore any point outside the reduced shape (and therefore likely to belong to the bone mass of the cranium) is automatically excluded.
Region filling of the brain is also performed to obtain the full shape of the brain.

Segmentation of the Tumour

Figure 6A:
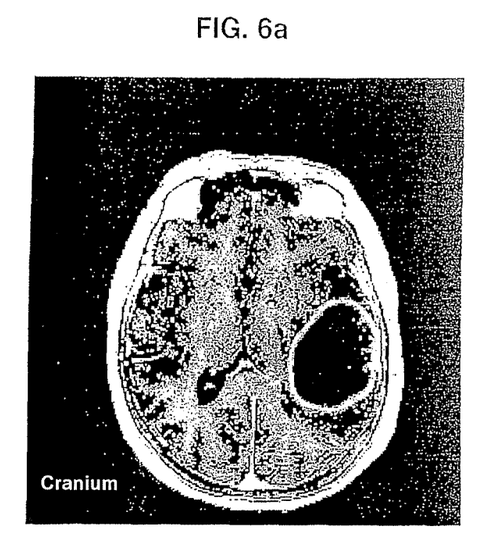
FIGS. 6a to 6d show an example of application of a method to determine volume from a brain image.
Figure 6B:
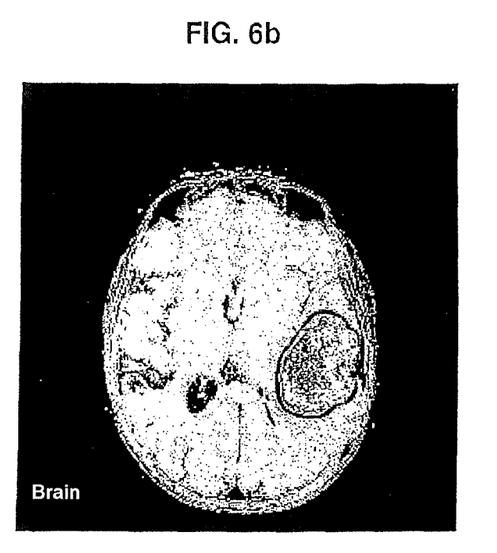
Figure 6C:
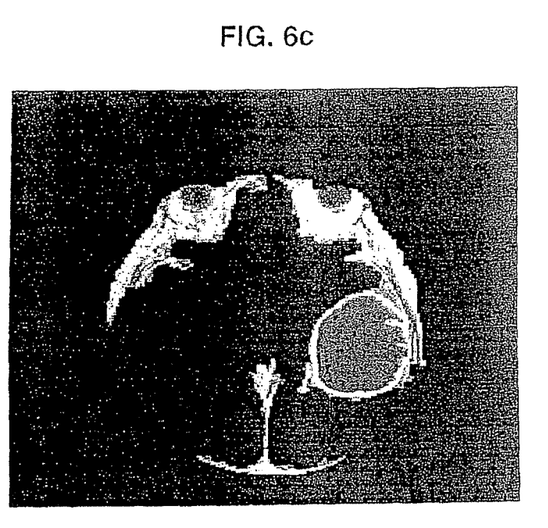

Thresholding is then carried out to obtain the best segmentation of the tumour (or any other anomaly) as illustrated FIG. 6c. Advantageously a variance filter (for example in the form of a 3×3 mask) may be applied to the initial image before thresholding the resulting image.

The exclusion region defined previously makes it possible not to take the cranium into account when thresholding the tumour. In this case, region filling of the different sets of points is carried out. The exclusion region allows region filling to be performed on all the elements inside the cranium and not on the cranium itself.

Figure 6D:
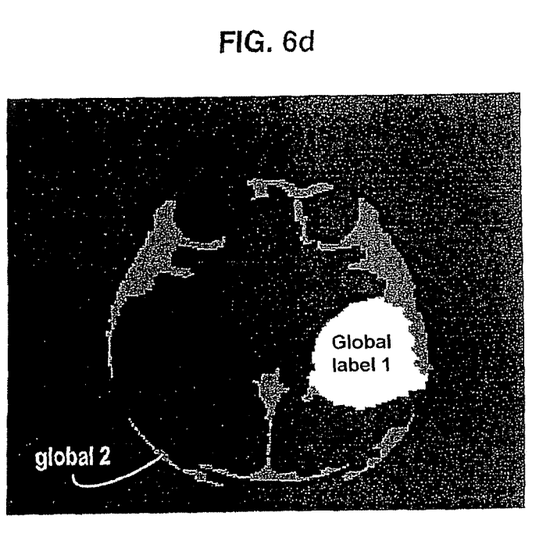

The image is then labelled (see FIG. 6d). This labelling of the image enables the practitioner to define the set to be examined (global label value 1) here representing the tumour, and the set outside the set to be examined (global label value 2). The tumour is thereby segmented, indicating in the initial image the positions of a point of each connected set forming the tumour.

Advantageously, in the initial image it is possible to define boundaries used to separate one same set of connected points into several sets (for example by separating the tumour from the remainder of the image). These boundaries make it possible to disjoin sets in which parts of the tumour are connected to elements considered to be external elements (see FIG. 6d).

Volume Calculation

Figure 7:
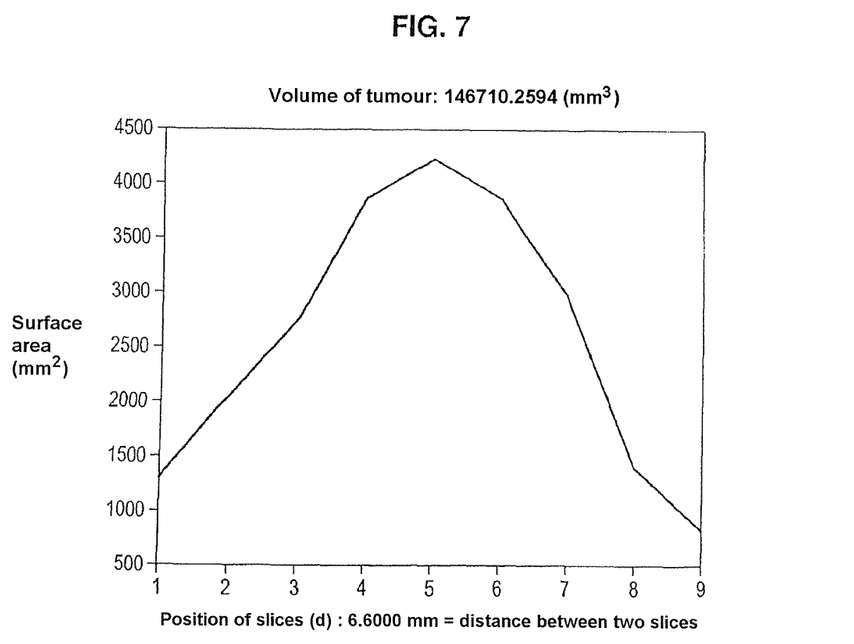
FIG. 7 is a graph showing the different surface areas of a volume to be determined over a series of slices.

At the end of the method and with reference to FIG. 7, the volume of the connected set to be examined is calculated (e.g. the tumour). From spatial resolution of the image and spacing between each image, it is possible, using the counted number of voxels in the segmented set, to determine the volume of the tumour. The volume is therefore calculated by performing linear interpolation between the surface area of the successive slices of the tumour.

The invention claimed is:

1. A method to transmit a label between two images, the method comprising:
providing a first image ($I^{n-1}$), the first image comprising several sets of connected points, each set being characterized by a label;
providing a second image ($I^n$);
determining, by utilizing a processor, several sets of connected points from said second image;
superimposing, by utilizing said processor, the two images to determine
the common parts of the sets of the first and second image, wherein the common parts correspond to sub-sets of the sets in the second image of which each pixel is common to the sets of the first image and of the second image, and
the non-common parts of the sets of the first and second image, wherein the non-common parts correspond to sub-sets of the sets in the second image resulting from amputation of the common parts of the sets of the first and second image,
giving each common part of the second image the label of the set in the first image with which said part is common;
giving each non-common part of the second image in contact with a single set of connected points in the first image the label of said set;
giving each non-common part of the second image not in contact with any set in the first image a new label, and
each non-common part of the second image in contact with at least two sets of connected points in the first image having a different label:
receiving a new label different from the labels of said two sets of connected points in the first image, or
being deleted.

2. The method according to claim 1, wherein each label is characterized by a value, the method further comprising the following step:
creating an equivalence between the labels of two sets in the first image in contact with a same set in the second image.

3. The method according to claim 2, wherein several labels are incompatible, so that no equivalence is created between these labels.

4. The method according to claim 1, wherein the step to determine sets comprises at least one of the following processing steps: segmentation, application of a variance filter, region filling.

5. A method to determine volumes from different images, each image representing substantially parallel successive planes, the method comprising:
choosing an initial image from among all images;
choosing points in the initial image whose volume is to be determined;
determining, by utilizing a processor, several sets of connected points in the initial image, so that the selected points belong to the same set, said set having a primary label, the other sets having a secondary label;

applying, by utilizing said processor, the label transmission method according to claim 1 to all the images; and determining, by utilizing said processor, the volume corresponding to the sets of each image comprising said specific label.

6. The method according to claim 5, further comprising integrating the surface areas of the sets in each image comprising said specific label.

7. The method according to claim 5 or 6, wherein said images are medical CT-scan or MRI images.

8. The method according to claim 7, wherein said CT-scan or MRI images include images of a patient's brain, the method further comprising:

prior to determining the volume, determining, in the initial image, the set corresponding to the patient's cranium and determining, in the initial image, the set corresponding to the patient's brain.

9. A device to determine volume from medical images, each image representing substantially parallel successive planes, the device comprising a processor configured to:

choose an initial image from among all images;

choose points in the initial image whose volume is to be determined;

determine several sets of connected points in the initial image, so that the selected points belong to the same set, said set having a primary label, the other sets having a secondary label;

apply the label transmission method according to claim 1 to all the images; and determine the volume corresponding to the sets of each image comprising said specific label.

10. The device according to claim 9, further comprising an apparatus to acquire said medical images.

11. A non-transitory computer-readable storage medium having stored thereon computer executable program for determining volume from medical images, the computer program when executed causes a processor to execute all the steps of the method according to claim 5 or 6.

\* \* \* \* \*